United States Patent
Maruyama et al.

(10) Patent No.: US 6,908,958 B2
(45) Date of Patent: Jun. 21, 2005

(54) ORGANICALLY MODIFIED LAYERED CLAY AS WELL AS ORGANIC POLYMER COMPOSITION AND TIRE INNER LINER CONTAINING SAME

(75) Inventors: Tsukasa Maruyama, Hiratsuka (JP); Kazunori Ishikawa, Hiratsuka (JP); Naoya Amino, Hiratsuka (JP); Masahiro Ikawa, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 119 days.

(21) Appl. No.: 10/396,506

(22) Filed: Mar. 26, 2003

(65) Prior Publication Data

US 2003/0191224 A1 Oct. 9, 2003

(30) Foreign Application Priority Data

| Mar. 27, 2002 | (JP) | 2002-089216 |
| Apr. 23, 2002 | (JP) | 2002-121241 |
| May 2, 2002 | (JP) | 2002-130684 |
| Nov. 6, 2002 | (JP) | 2002-322950 |
| Mar. 19, 2003 | (JP) | 2003-075252 |

(51) Int. Cl.$^7$ ............................................. C08K 3/34
(52) U.S. Cl. .................... 524/445; 524/321; 524/425; 524/538; 523/351; 525/70
(58) Field of Search .......................... 524/445, 321, 524/425, 538; 523/351; 525/70

(56) References Cited

U.S. PATENT DOCUMENTS

| 4,218,349 A | * | 8/1980 | Minatono et al. ............ 525/207 |
| 5,397,837 A | * | 3/1995 | Arjunan ........................ 525/72 |
| 5,801,216 A | * | 9/1998 | Pinnavaia et al. .......... 523/209 |
| 6,384,121 B1 | * | 5/2002 | Barbee et al. ............... 524/445 |
| 6,417,262 B1 | * | 7/2002 | Turner et al. ................ 524/445 |
| 6,548,587 B1 | * | 4/2003 | Bagrodia et al. ............ 524/445 |

FOREIGN PATENT DOCUMENTS

| JP | 6-84456 B2 | 10/1994 |
| JP | 8-510421 A1 | 11/1996 |
| JP | 9-87432 A1 | 3/1997 |
| JP | 10-81785 A1 | 3/1998 |
| JP | 2000-169634 A1 | 6/2000 |
| JP | 2002-88208 A1 | 3/2002 |

* cited by examiner

Primary Examiner—David W. Wu
Assistant Examiner—Henry S. Hu
(74) Attorney, Agent, or Firm—Rader, Fishman & Grauer PLLC

(57) ABSTRACT

An organically modified layered clay ionically bonded with an organic compound having an ammonium group and an amino group, an organic polymer composition containing the same and an organic polymer capable of reacting with the amino group, and an inner liner using the same.

8 Claims, 1 Drawing Sheet

US 6,908,958 B2

ORGANICALLY MODIFIED LAYERED CLAY AS WELL AS ORGANIC POLYMER COMPOSITION AND TIRE INNER LINER CONTAINING SAME

BACKGROUND OF THE INVENTION

1. Field of the Invention

The present invention relates to an organically modified layered clay as well as an organic polymer composition containing the same and a tire inner liner formed from the organic polymer composition. More specifically, it relates to an organic polymer composition having layered clay, of which layers are exfoliated, finely dispersed therein, obtained by mixing a certain specific organically modified layered clay with a specific organic polymer. Such an organic polymer composition is suitably used, for example, for a tread, carcass, inner liner, etc. of a pneumatic tire utilizing its abrasion resistance, air barrier property, and other properties.

2. Description of the Related Art

JP-B-6-84456 reports a rubber composition comprising a rubber and layers of a layered clay dispersed therein, while JP-A-8-510421 reports the improvement in the gas barrier property of this rubber composition. Further, JP-A-10-81785 reports kneading an organically modified clay and rubber using a rubber process oil to uniformly disperse the clay in the rubber. Further, JP-A-2000-169634 reports the improvements of the physical properties of an organically modified clay-resin composite material, by using a thermoplastic resin having a polar group such as an acid anhydride group, epoxy group and carboxyl group. However, these polar groups do not react with the organic moiety of the organically modified clay. Further, while allusion is made to the dispersion properties of the clay, it is not clear whether this is a simple dispersion or a dispersion at nanolevel.

Further, according to JP-B-6-84456, an organic solvent should be used during the production of the liquid rubber composite containing a layered clay and, therefore, this is environmentally unpreferable. In addition, in JP-B-6-84456, the liquid rubber composite is prepared by directly reacting a layered clay and a liquid rubber having positively charged group in the main chain or side chain. However, it is pointed out therein that the preparation of the liquid rubber composite having a positively charged group is difficult and that the desired smelling between the layers of the clay is not sufficient by the reaction of the liquid rubber and the layered clay (see column [0003], lines 22–31 of JP-A-9-87432).

Further, JP-A-2002-88208 reports that, by using a halogenated butyl rubber containing a layered clay for the inner liner of a tire, the air barrier property can be enhanced. However, in general the use of a simple layered clay for decreasing the air permeability causes the problem that it is necessary to add a large amount of the layered clay.

SUMMARY OF THE INVENTION

The objects of the present invention are to provide an organically modified layered clay, an organic polymer composition comprising an organic polymer/clay nanocomposite having exfoliated layers of the organically modified layered clay which is uniformly finely dispersed in an organic polymer, and a tire inner liner comprising this organic polymer composition.

In accordance with the present invention, there is provided an organically modified layered clay ionically bonded with an organic compound having an ammonium group and amino group.

In accordance with the present invention, there is also provided an organic polymer composition comprising an organically modified layered clay by ionically bonding an organic compound having an ammonium group and an amino group with an organic polymer having a functional group capable of reacting with said amino group.

In accordance with the present invention, there is further provided an organic polymer composition comprising (i) an organic polymer, (ii) an organically modified layered clay by ionically bonding therewith an organic compound having an ammonium group and an amino group, and (iii) a low molecular weight organic polymer having a weight average molecular weight of less than 50,000 and/or a high molecular weight organic polymer having a weight average molecular weight of 50,000 or more, each having a functional group capable of reacting with an amino group. In particular, the use of a low molecular weight organic polymer capable of covalently bonding with the organic moiety of the organically modified layered clay to cause the layers of the layered clay to be exfoliated and finely dispersed in the matrix of the high molecular weight organic polymer is an important characteristic of the present invention. Note that the above organic polymers are preferably those having a weight average molecular weight of at least 50,000, preferably 100,000 to 1,000,000 and not necessarily have a functional group capable of reacting with an amino group in the case of using the low molecular weight organic polymer.

In accordance with the present invention, there is still further provided a tire inner liner comprising using the above organic polymer composition.

BRIEF DESCRIPTION OF THE DRAWINGS

The present invention will now be explained in detail with reference to the drawing FIG. 1, wherein.

DESCRIPTION OF THE PREFERRED EMBODIMENTS

Figure 1A:
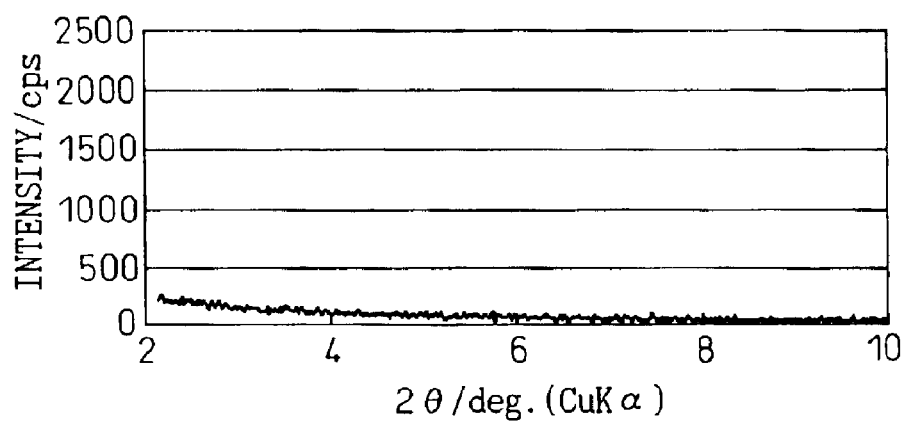
FIG. 1(a) shows an X-ray diffraction charts of the organic polymer compositions obtained in Example 19 below.

The singular forms "a", "an" and "the" include plural referents unless the context clearly dictates otherwise.

The present inventors found that, by forming an organic polymer composition composed of an organically modified layered clay by ionic bonding of an organic compound having an ammonium group and an amino group in the molecule thereof and an organic polymer having a functional group capable of reacting with an amino group and by forming an organic polymer composition composed of an organically modified layered clay by ionic bonding of an organic compound having an ammonium group and an amino group in the molecule thereof and a low molecular weight organic polymer having an average molecular weight of less than 50,000 and having a functional group capable of reacting with an amino group and/or a high molecular weight organic polymer having a weight average molecular weight of 50,000 or more and having a functional group capable of reacting with an amino group, it is possible to form an organic polymer/clay nanocomposite having layers of the layered clay, of which layers are exfoliated, finely dispersed therein.

The organically modified layered clay ionically bonded with an organic compound having an ammonium group and an amino group in the molecule thereof, according to the present invention can be easily obtained by treating a layered clay according to a known method disclosed in, for example, JP-A-2001-164134. Here, "ammonium group" means a group having the following moiety:

The organic compound having an ammonium group and an amino group in the molecule thereof used, as an organic treatment agent in the present invention can be produced, with a relatively good purity, by a reaction of, for example, hydrochloric acid with a compound having a plurality of nitrogen atoms of different basicities, preferably a compound having two nitrogen atoms of different basicities. For example, it can be obtained by converting, to ammonium group, just one amino group of an organic compound having two or more nitrogen atoms of different basicities such as primary and secondary amino groups, primary and tertiary amino groups, or secondary and tertiary amino groups. Note that there may be a plurality of amino groups in the organic compound.

The organic treatment agent used in the present invention can be obtained by a reaction of an organic compound having preferably the following formula (I):

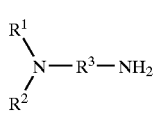

with, for example, an inorganic acid such as hydrochloric acid, sulfuric acid, phosphoric acid and perchloric acid or an organic acid such as acetic acid in an amount of preferably 0.8 to 1.2 moles per 1 mole of organic compound, preferably, at room temperature to a temperature of 110° C. in water or an alcohol such as methanol, ethanol, isopropyl alcohol, butanol, or a mixed solvent thereof. As another method, it can be obtained by a reaction of a diamine with a halogenated alkyl.

In the above formula (I), $R^1$ is a $C_2$ to $C_{30}$ organic group, in particular, preferably a $C_4$ to $C_{18}$ hydrocarbon group. Specifically, a butyl group, octyl group, decyl group, dodecyl group, hexadecyl group, octadecyl group, or oleyl group may be mentioned as a suitable group. In formula (I), $R^2$ is a hydrogen atom or a $C_2$ to $C_{30}$ organic group. Specifically, a hydrogen atom or a butyl group, octyl group, decyl group, dodecyl group, hexadecyl group, octadecyl group, or oleyl group may be mentioned as a suitable group especially, at least either of $R^1$ or $R^2$ is preferably a $C_{10}$–$C_{18}$ saturated or unsaturated hydrocarbon group. Further, $R^3$ is a $C_2$–$C_{18}$ alkylene group which may contain a heteroatom. Specifically, an ethylene group, propylene group, hexamethylene group, decamethylene group, methylene bis (cyclohexylene) group or xylylene group may be mentioned as a suitable group.

Further, as another example of the above organic treatment agent, it is also possible to use an organic compound, derived from aminopyridine, having a pyridinium group as an ammonium group and an amino group in the molecule thereof.

Examples of said layered clay to be organically modified in the present invention are smectite-type clays such as, montmorillonite, saponite, beidellite, nontronite, hectorite, stevensite; vermiculite, halloysite, etc. It is possible to use either natural or synthetic layered clays. Further, in the present invention, these layered clays may be used alone or in any mixtures thereof. These layered clays preferably having positive ion exchange amounts of 10 to 300 milliequivalents/100 g and an aspect ratio (i.e., a ratio of length or width of clay to thickness thereof) of 30 or more.

Examples of the high molecular weight organic polymer having weight average molecular weight 50,000 or more used in the present invention are high molecular weight polymers not having said functional groups such as natural rubber, isoprene rubber, styrene rubber, nitrile rubber, ethylene-propylene-diene rubber, butadiene rubber, butyl rubber, urethane rubber, fluororubber, silicone rubber, styrene-butadiene copolymer rubber, polyethylene, polypropylene, polystyrene, and high molecular weight polymers having said functional groups such as epoxylated natural rubber, chloroprene rubber, halogenated butyl rubber, brominated copolymer of isobutylene and paramethylstyrene, epichlorohydrin rubber, acrylic rubber, ethylene vinyl acetate rubber, chlorinated polyethylene rubber, maleic anhydride modified polypropylene, maleic anhydride modified ethylene-propylene copolymer. These rubbers and resins are formed in bulk and, in some cases, are used to be cross-linked. Thus, those having a molecular weight of at least 50,000, particularly at least 100,000, are preferred. Note that, when using a high molecular weight organic polymer having a functional group capable of reacting with an amino group such as, an acid anhydride group, epoxy group, halogen group, carboxylic acid group, acryl group, methacryl group, isocyanate group, ester group, a covalent bond is formed with the organic moiety of the organically modified layered clay and it is possible to exfoliate, and to finely disperse, the layers of the layered clay in the matrix of the high molecular weight organic polymer.

Examples of the functional group of the low molecular weight organic polymer having a weight average molecular weight of less than 50,000 and having a functional group capable of reacting with an amino group effectively used in the present invention are an acid anhydride group, epoxy group, halogen group, carboxylic acid group, acryl group, methacryl group, isocyanate group, ester group, etc. In particular, among these, an acid anhydride group, epoxy group, halogen group, carboxylic acid group may be suitably used. Preferable examples of such a low molecular weight organic polymer are liquid maleic anhydride modified polyisoprene, liquid maleic anhydride modified polybutadiene, liquid maleic anhydride modified polyisobutylene, liquid maleic anhydride modified polyethylene, liquid maleic anhydride polypropylene, liquid epoxylated polybutadiene, liquid acrylated polybutadiene, etc., having a weight average molecular weight 300 to less than 50,000. The above modified polyisobutylene may include those copolymerized with 1-butene, 2-butene, etc.

The molecular weight of a low molecular weight organic polymer having such a functional group is 300 to less than 50,000, preferably 500 to 10,000, more preferably 500 to 3,000. If the molecular weight is less than 300, the layers of the layered clay cannot be sufficiently expanded.

The amount of addition of the low molecular weight organic polymer having a functional group capable of reacting with an amino group is preferably 0.05 to 2.0 equivalents, more preferably 0.1 to 1.2 equivalents, based upon the amino groups present in the layered clay. If this amount of addition is too small, the layers of the layered clay are liable not to be sufficiently expanded. Further, if too much, in the case of a low molecular weight organic polymer, a large amount of free liquid organic polymer will be present in the matrix organic polymer and a detrimental effect is liable to be given to the physical properties thereof. Further, the relationship between the type of the high molecular weight organic polymer and low molecular weight organic polymer is not particularly limited, but preferably the both polymers are at least partially compatible with each other.

The organic polymer composition of the present invention contain preferably 0.5 to 70 parts by weight, more preferably 0.5 to 30 parts by weight of the organically modified layered clay, based upon 100 parts by weight of the high molecular weight organic polymer. When the amount of the organically modified layered clay is less than 0.5 parts by weight, the reinforcing effect to the organic polymer component is not sufficient and, therefore, the desired properties tend to be difficult to obtain. Contrary to this, when the amount is more than 70 parts by weight, the mechanical properties tend to decrease and the processability tends to become poor due to the increase in the viscosity.

In the organic polymer composition of the present invention, in addition to the above-mentioned essential ingredients, various compounding agents and additives such as reinforcing agents (e.g., carbon black, silica), vulcanization or cross-linking agents, vulcanization or cross-linking accelerators, various types of oils, antioxidants, fillers, softening agents, plasticizers, silane coupling agents, etc. may be compounded therein. The amounts of these compounding agents and additives may be in general amounts suited to the application.

Among the organic polymer compositions of the present invention, for the preparation of particularly three-component type organic polymer compositions, it is possible to mix the above organic polymer, low molecular weight organic polymer, and organically modified layered clay all together in a generally used mixer, together with predetermined additives from the start, but it is also possible to adopt the method of mixing the organically modified clay with the low molecular weight polymer in advance, then compounding and mixing the organic polymer and the predetermined additives. To obtain the desired organic polymer/clay nanocomposite according to the present invention, where the layers of the layered clay are exfoliated and finely dispersed, it is preferable to use this mixing method.

The composite composed of the organically modified layered clay according to the above method and the low molecular weight organic polymer having a functional group capable of reactive with an amino group is prepared by mixing the organically modified layered clay and the low molecular weight organic polymer in a solvent. The solvent is not particularly limited so long as the low molecular weight organic polymer is dissolved therein. Nonpolar solvents such as toluene, benzene, xylene, hexane, octane may be mentioned. The temperature at the time of the reaction is room temperature to 200° C., preferably room temperature to 150° C. Further, the composite can be prepared without using the above solvent. When preparing the composite, it is also possible to jointly use various types of oils. As the oils which can be used, process oils which are used to improve the processability of rubber may be mentioned. Examples are paraffinic oil, naphthenic oil, aromatic oil, etc. These oils may be used alone or in combination thereof. The above composite can also be prepared by mixing the above layered clay dispersed in water with the above organic treatment agent prepared in the oil used for improving the processability of the rubber, followed by mixing with the above low molecular weight organic polymer dissolved in the oil used for improving the processability of the rubber, to thereby obtain the composite having a high dispersibility in the rubber. The mixing ratio of the low molecular weight organic polymer to the layered clay at the time of preparing the composite is preferably 0.05 to 2.0 equivalents, more preferably 0.1 to 1.2 equivalents, based upon the amino groups in the layered clay. If the mixing ratio is too small, interlayer distance of the clay may not be able to sufficiently expanded, while if too large, a large amount of free low molecular weight organic polymer having a functional group capable of reacting with an amino group will be present in the high molecular weight organic polymer matrix and will have a detrimental effect on the physical properties and, therefore, neither of these is preferred.

The organic polymer composition of the present invention is prepared by mixing or kneading, but the mixer or kneader used for the mixing or kneading is not particularly limited. A screw extruder, kneader, Bambury mixer, roll, twin-screw extruder, etc. may be exemplified. Further, two or more types of mixers or kneaders may be used for successive kneading.

The organic polymer composition according to the present invention has layers of the clay nanodispersed in the organic polymer. The layers act as barriers at the time of air leakage and improve the gas barrier property, and therefore the composition can be suitably used for the inner liner of a pneumatic tire and can be used for a rubber product etc. stressing the gas barrier property such as a tube or hose. The methods of production of these may be based on conventional general methods.

EXAMPLES

The present invention will now be further explained by Examples and Comparative Examples, but the scope of the present invention is, of course, not limited to these Examples.

Preparation of Organic Clay 1

279.5 g of alkyl propylenediamine (made by NOF Corporation, Asphazol #10) and 86.8 g of 35% hydrochloric acid were reacted in 500 ml of isopropanol at not more than 50° C. The resultant suspension was added to 700 g of a sodium montmorillonite (made by Kunimine Ind. Co., Kunipia-F) dispersed in 28 liters of water, in advance, at 90° C. and stirred at the same temperature for 12 hours. The precipitate thus obtained was filtered, washed with warm water, and dried to prepare the organically modified clay, i.e., organic clay 1.

Preparation of Organic Clay 2

The organic clay 2 was prepared in the same manner as in the above organic clay 1, except that 225.8 g of stearylamine (made by Kao, Farmin 80) was used instead of the alkyl propylenediamine.

Preparation of Organic Clay 3

The organic clay 3 was prepared in the same manner as in the organic clay 1, except that 406 g of distearylamine (made by Kao, Farmin D86) was used instead of the alkyl propylenediamine.

Preparation of Composite 1

160 g of alkyl propylenediamine (made by NOF Corporation, Asphazol #10) and 49.6 g of 35% hydrochloric acid were reacted at 80° C. in 245 g of a process oil (made by Japan Energy Corporation, Process X140). The resultant suspension was added at 90° C. to 400 g of a sodium montmorillonite (made by Kunimine Ind. Co., Kunipia-F) previously dispersed in 16 liters of water and stirred at the same temperature for 1 hour. Thereafter, a mixture solution of 408 g of liquid maleic anhydride modified polyisoprene (Kuraray Co., Ltd., Kuraprene LIR 403) and 245 g of a process oil (made by Japan Energy Corporation, Process X140) was added thereto and further stirred at the same temperature for 11 hours. The precipitate thus obtained was filtered, washed with warm water and dried to prepare the composite 1.

Preparation of Composite 2

The composite 2 was prepared in the same manner as in the composite 1, except that 479 g of liquid maleic anhydride modified polybutadiene (made by Nippon Petrochemicals Co., Ltd., M-1000-20) was used instead of the liquid maleic anhydride modified polyisoprene.

Preparation of Composite 3

The composite 3 was prepared in the same manner as in the composite 1, except that 343 g of liquid maleic anhydride modified polyisobutyrene (made by Nippon Petrochemicals Co., Ltd., HV-100M) was used instead of the liquid maleic anhydride modified polyisoprene and a process oil (made by Japan Energy Corporation, Process P200) was used instead of the process oil (made by Japan Energy Corporation, Process X140) in the same amount.

Preparation of Composite 4

160 g of alkyl propylenediamine (made by NOF Corporation, Asphazol #10) and 49.6 g of 35% hydrochloric acid were reacted at 80° C. in 490 g of a process oil (made by Japan Energy Corporation, Process P200). The resultant suspension was added at 80° C. to 400 g of a sodium montmorillonite (made by Kunimine Ind. Co., Kunipia-F) previously dispersed in 16 liters of water and stirred at the same temperature for 12 hours. The precipitate thus obtained was filtered, washed with warm water and dried to prepare the composite 4.

Preparation of Composite 5

The composite 5 was prepared in the same manner as in the composite 1, except that 129 g of stearylamine (made by Kao, Farmin 80) was used instead of the alkyl propylenediamine.

Preparation of Composite 6

The composite 6 was prepared in the same manner as in the composite 1, except that 129 g of stearylamine (made by Kao, Farmin 80) was used instead of alkyl propylenediamine and 479 g of liquid maleic anhydride modified polybutadiene (made by Nippon Petrochemicals Co., Ltd., M-1000-20) was used instead of the liquid maleic anhydride modified polyisoprene.

Preparation of Composite 7

The composition 7 was prepared in the same manner as in the composite 1, except that 129 g of stearylamine (made by Kao, Farmin 80) was used instead of alkyl propylenediamine and 343 g of liquid maleic anhydride modified polyisobutyrene (made by Nippon Petrochemicals Co., Ltd., HV-100M) was used instead of the liquid maleic anhydride modified polyisoprene and a process oil (made by Japan Energy Corporation, Process P200) was used instead of the process oil (made by Japan Energy Corporation, Process X140) in the same amount.

Preparation of Composite 8

The composite 8 was prepared in the same manner as in the composite 4, except that 129 g of stearylamine (made by Kao Farmin 80) was used instead of the alkyl propylenediamine.

Examples 1 to 18 and Comparative Examples 1 to 13

Predetermined amounts of the various types of rubber and liquid rubber and the other various compounding agents shown in the following Table I were charged into a Bambury mixer in the formulation shown in Table I and sufficiently mixed to obtain a sample of rubber sheet. Further, the predetermined amounts of a rubber and a composite shown in the following Table II were sufficiently mixed, then the other compounding agents were charged into a Bambury mixer in the formulation shown in Table II and mixed to obtain a sample of rubber sheet.

The sample of the rubber sheet obtained above was analyzed using X-ray diffraction to confirm the dispersion properties of the organically modified layered clay in the rubber sheet. Cases where the peaks derived from the organically modified layered clay disappeared in the X-ray diffraction were evaluated as "○" (Good), particularly superior cases as "⊙" (very Good), and cases where peaks derived from the organically modified layered clay remained without completely disappearing as "X" (Poor).

The results are shown in Table I and Table II.

TABLE I

|  | Ex. 1 | Ex. 2 | Ex. 3 | Ex. 4 | Ex. 5 | Ex. 6 | Ex. 7 | Ex. 8 | Ex. 9 | Comp. Ex. 1 |
|---|---|---|---|---|---|---|---|---|---|---|
| Formulation (parts by weight) | | | | | | | | | | |
| Natural rubber (RSS#1) | 100 | 100 | 100 | — | — | — | — | 60 | 20 | 100 |
| Styrene butadiene rubber[1] | — | — | — | 100 | — | — | — | 30 | — | — |
| Butadiene rubber[2] | — | — | — | — | — | — | — | 10 | — | — |
| Butyl rubber[3] | — | — | — | — | 100 | — | — | — | 80 | — |
| Bromobutyl rubber[4] | — | — | — | — | — | 100 | 100 | — | — | — |
| Carbon black[5] | 60 | 60 | 60 | 60 | 60 | 60 | 60 | 60 | 60 | 60 |
| Organic clay 1 | 8 | 8 | 8 | 8 | 8 | 8 | 8 | 8 | 8 | — |
| Organic clay 2 | — | — | — | — | — | — | — | — | — | 8 |
| Liquid maleic anhydride modified polyisoprene[6] | 6 | — | — | 7 | — | — | — | — | — | — |
| Liquid maleic anhydride modified polybutadiene[7] | — | 7 | — | — | — | — | — | 7 | — | — |
| Liquid maleic anhydride modified polyisobutylene[8] | — | — | 5 | — | 5 | — | 5 | — | 5 | — |
| Process oil | 7.2 | 7.2 | 7.2 | 7.2 | 7.2 | 7.2 | 7.2 | 7.2 | 7.2 | 7.2 |

TABLE I-continued

| Evaluation of dispersion properties | ○ | ○ | ○ | ○ | ○ | ◎ | ◎ | ○ | ○ | X |
|---|---|---|---|---|---|---|---|---|---|---|

|  | Comp. Ex. 2 | Comp. Ex. 3 | Comp. Ex. 4 | Comp. Ex. 5 | Comp. Ex. 6 | Comp. Ex. 7 |
|---|---|---|---|---|---|---|
| Formulation (parts by weight) | | | | | | |
| Natural rubber (RSS#1) | 100 | — | — | — | — | 60 |
| Styrene butadiene rubber[1] | — | 100 | — | — | — | 30 |
| Butadiene rubber[2] | — | — | — | — | — | 10 |
| Butyl rubber[3] | — | — | 100 | — | — | — |
| Bromobutyl rubber[4] | — | — | — | 100 | 100 | — |
| Carbon black[5] | 60 | 60 | 60 | 60 | 60 | 60 |
| Organic clay 1 | — | — | — | — | — | — |
| Organic clay 2 | 8 | 8 | 8 | 8 | 8 | 8 |
| Liquid maleic anhydride modified polyisoprene[6] | 6 | — | — | — | — | — |
| Liquid maleic anhydride modified polybutadiene[7] | — | 7 | — | — | — | 7 |
| Liquid maleic anhydride modified polyisobutylene[8] | — | — | 5 | — | 5 | — |
| Process oil | 7.2 | 7.2 | 7.2 | 7.2 | 7.2 | 7.2 |
| Evaluation of dispersion properties | X | X | X | X | X | X |

Table II Notes
[1] Nipol 1502 (made by Nippon Zeon)
[2] Nipol BR 1220 (made by Nippon Zeon)
[3] Exxon Butyl 268 (made by Exxon Chemical)
[4] Exxon Bromobutyl 2255 (made by Exxon Chemical)
[5] Diablack G (made by Mitsubishi Chemical)
[6] Kuraprene LIR 403 (made by Kuraray)
[7] M-1000-20 (made by Nippon Petrochemicals)
[8] HV-100 M (made by Nippon Petrochemicals)

TABLE II

|  | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|
| Formulation (parts by weight) | | | | | | | | | |
| Natural rubber (RSS #1) | 100 | 100 | 100 | — | — | — | — | 60 | 20 |
| Styrene-butadiene rubber[1] | — | — | — | 100 | — | — | — | 30 | — |
| Butadiene rubber[2] | — | — | — | — | — | — | — | 10 | — |
| Butyl rubber[3] | — | — | — | — | 100 | — | — | — | 80 |
| Bromobutyl rubber[4] | — | — | — | — | — | 100 | 100 | — | — |
| Carbon black[5] | 60 | 60 | 60 | 60 | 60 | 60 | 60 | 60 | 60 |
| Composite 1[6] | 21.2 | — | — | — | — | — | — | — | — |
| Composite 2[6] | — | 22.2 | — | 22.2 | — | — | — | 22.2 | — |
| Composite 3[6] | — | — | 20.2 | — | 20.2 | 20.2 | — | — | 20.2 |
| Composite 4[6] | — | — | — | — | — | — | 15.2 | — | — |
| Composite 5[6] | — | — | — | — | — | — | — | — | — |
| Composite 6[6] | — | — | — | — | — | — | — | — | — |
| Composite 7[6] | — | — | — | — | — | — | — | — | — |
| Composite 8[6] | — | — | — | — | — | — | — | — | — |
| Evaluation of dispersion properties | ○ | ○ | ○ | ○ | ○ | ◎ | ◎ | ○ | ○ |

|  | Comp. Ex. 8 | Comp. Ex. 9 | Comp. Ex. 10 | Comp. Ex. 11 | Comp. Ex. 12 | Comp. Ex. 13 |
|---|---|---|---|---|---|---|
| Formulation (parts by weight) | | | | | | |
| Natural rubber (RSS #1) | 100 | — | — | — | — | 60 |
| Styrene-butadiene rubber[1] | — | 100 | — | — | — | 30 |
| Butadiene rubber[2] | — | — | — | — | — | 10 |
| Butyl rubber[3] | — | — | 100 | — | — | — |
| Bromobutyl rubber[4] | — | — | — | 100 | 100 | — |
| Carbon black[5] | 60 | 60 | 60 | 60 | 60 | 60 |
| Composite 1[6] | — | — | — | — | — | — |
| Composite 2[6] | — | — | — | — | — | — |
| Composite 3[6] | — | — | — | — | — | — |
| Composite 4[6] | — | — | — | — | — | — |
| Composite 5[6] | 21.2 | — | — | — | — | — |
| Composite 6[6] | — | 22.2 | — | — | — | 22.2 |
| Composite 7[6] | — | — | 20.2 | 20.2 | — | — |

TABLE II-continued

|  |  |  |  |  |  |  |
|---|---|---|---|---|---|---|
| Composite 8[6)] | — | — | — | — | 15.2 | — |
| Evaluation of dispersion properties | X | X | X | X | X | X |

Table III Notes
[1)]Nipol 1502 (made by Nippon Zeon)
[2)]Nipol BR 1220 (made by Nippon Zeon)
[3)]Exxon Butyl 268 (made by Exxon Chemical)
[4)]Exxon Bromobutyl 2255 (made by Exxon Chemical)
[5)]Diablack G (made by Mitsubishi Chemical)
[6)]See the above Preparation Example

Examples 19 to 21 and Comparative Examples 14 and 15

Figure 1B:
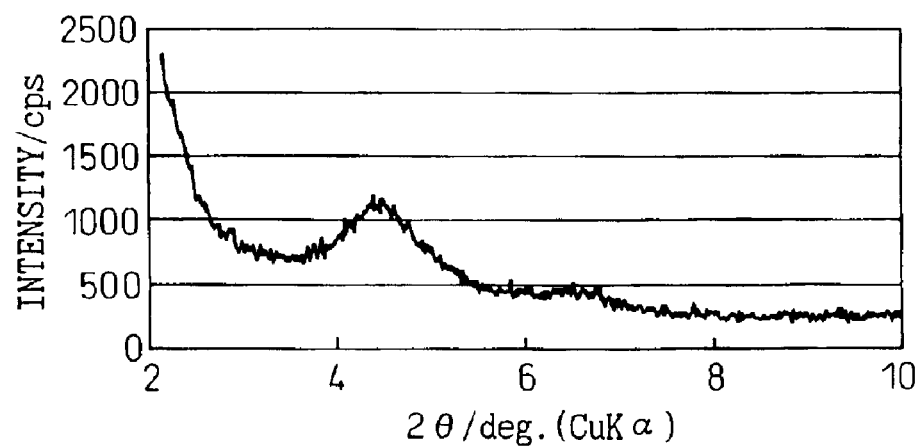
FIG. 1(b) shows an X-ray diffraction chart of the organic polymer composition obtained in Comparative Example 15below.

Bromobutyl rubber and various compounding agents were charged into a Bambury mixer in the formulation shown in the following Table III and sufficiently mixed to obtain a master batches, then a sample of rubber sheet was obtained. The sample of the rubber sheet thus obtained was analyzed using X-ray diffraction to confirm the dispersion properties of the organically modified layered clay in the rubber sheet. Cases where the peaks derived from the organically modified layered clay disappeared in the X-ray diffraction were evaluated as "○" (Good), particularly superior cases as "⊙" (Very Good), and cases where peaks derived from the organically modified layered clay remained without completely disappearing as "X" (Poor). For reference the X-ray diffraction charts of Example 19 and Comparative Example 15 are shown in FIG. 1.

Further, vulcanization system ingredients of 3 parts by weight of zinc oxide, 0.8 part by weight of sulfur and 0.5 part by weight of dibenzothiazovl sulfide were added to the rubber compositions of the different Examples shown in the following Table III and mixed, then the compositions were vulcanized at 145° C. for 40 minutes to prepare test pieces (i.e., rubber sheets) which were then measured and evaluated as to air permeability at 70° C. using an air permeability measuring apparatus. The air permeability of Comparative Example 14 was used as 100 (i.e., standard) and the other Examples expressed as indexes, based upon this standard. The above results are shown in Table III.

TABLE III

|  | Ex. 19 | Ex. 20 | Ex. 21 | Comp. Ex. 14 | Comp. Ex. 15 |
|---|---|---|---|---|---|
| Formulation (parts by weight) |  |  |  |  |  |
| Bromobutyl rubber | 100 | 100 | 100 | 100 | 100 |
| Carbon black[1)] | 60 | 60 | 60 | 60 | 60 |
| Organic clay 1[2)] | 8 | 12 | 8 | — | — |
| Organic clay 2[3)] | — | — | — | 8 | — |
| Organic clay 3[4)] | — | — | — | — | 8 |
| Liquid rubber[5)] | 2 | 2 | — | 2 | 2 |
| Oil[6)] | 7.2 | 7.2 | 7.2 | 7.2 | 7.2 |
| Evaluated physical properties |  |  |  |  |  |
| Dispersion properties | ⊙ | ⊙ | ⊙ | X | X |
| Air permeability (index) | 62 | 58 | 69 | 100 | 101 |

Notes of Table III
[1)]Diablack G (made by Mitsubishi Chemical)
[2)]Reaction product of sodium montmorillonite (Kunipia-F) and alkyl propylenediamine hydrochloride TABLE III-continued

|  | Ex. 19 | Ex. 20 | Ex. 21 | Comp. Ex. 14 | Comp. Ex. 15 |
|---|---|---|---|---|---|

[3)]Reaction product of sodium montmorillonite (Kunipia-F) and stearylamine hydrochloride
[4)]Reaction product of sodium montmorillonite (Kunipia-F) and distearylamine hydrochloride
[5)]Maleic anhydride modified liquid polyisobutylene (made by Nippon Petrochemical HV-100 M)
[6)]Process oil (made by Japan Energy Corporation, Process P200)

As is clear from the results shown in the Examples of the present invention given above, according to the present invention, it is understood that an organic polymer/clay nanocomposite having layers of clay effectively exfoliated and finely dispersed is formed. Further, in a rubber composition containing this composited with rubber, it is understood that, compared with a rubber composition, in which a conventional organically modified layered clay is compounded, the degree of air permeability is greatly decreased. Therefore, the organic polymer composition of the present invention is extremely useful as a tire inner liner.

What is claimed is:
1. An organic polymer composition comprising:
   (i) an organically modified layered clay ionically bonded with an organic compound having an ammonium group and an amino group, and
   (ii) at least one low molecular weight organic polymer selected from the group consisting of maleic anhydride modified polyisoprene, maleic anhydride modified polybutadiene, maleic anhydride modified polyisobutylene, maleic anhydride modified polyethylene and maleic anhydride modified polypropylene, having a weight average, molecular weight of 300 to less than 50,000.
2. An organic polymer composition as claimed in claim 1, wherein said organic compound having an ammonium group and an amino group is obtained by a reaction of a diamine of the formula (1):

$$\begin{array}{c} R^1 \\ \diagdown \\ N-R^3-NH_2 \\ \diagup \\ R^2 \end{array} \quad (I)$$

wherein $R^1$ is a $C_2$ to $C_{30}$ organic group, $R^2$ is a hydrogen atom or a $C_2$ to $C_{30}$ organic group, and $R^3$ is a $C_2$ to $C_{18}$ alkylene group which may contain a heteroatom, with an inorganic or organic acid.
3. An organic polymer composition as claimed in claim 1, further comprising at least one high molecular weight organic polymer having a weight average molecular weight of 50,000 or more.

4. An organic polymer composition as claimed in claim 3, wherein said high molecular weight polymer is a halogenated butyl rubber.

5. An organic polymer composition as claimed in claim 3, wherein a composite obtained by treating in advance said organically modified layered clay (i) with said low molecular weight organic polymer (ii) is compounded into said high molecular weight organic polymer.

6. An organic polymer composition as claimed in claim 3, wherein the addition amount of the low molecular weight organic polymer is 0.05 to 2.0 equivalents per 1 equivalent of the amino group in the layered clay.

7. An organic polymer composition as claimed in claim 3, wherein the amount of the organically modified layered clay is 0.5 to 70 parts by weight, based upon 100 parts by weight of the high molecular weight organic polymer.

8. A tire inner liner comprising an organic polymer composition according to claim 3.

* * * * *